(12) United States Patent
Lin et al.

(10) Patent No.: US 10,404,408 B1
(45) Date of Patent: Sep. 3, 2019

(54) PAM MULTI-LEVEL ERROR DISTRIBUTION SIGNATURE CAPTURE

(71) Applicant: Xilinx, Inc., San Jose, CA (US)

(72) Inventors: Winson Lin, Daly City, CA (US); Hongtao Zhang, San Jose, CA (US); Yu Xu, Palo Alto, CA (US); Geoffrey Zhang, San Jose, CA (US)

(73) Assignee: XILINX, INC., San Jose, CA (US)

( * ) Notice: Subject to any disclaimer, the term of this patent is extended or adjusted under 35 U.S.C. 154(b) by 56 days.

(21) Appl. No.: 15/377,780

(22) Filed: Dec. 13, 2016

(51) Int. Cl.
| | | |
|---|---|---|
| H04L 1/00 | (2006.01) | |
| H04L 27/02 | (2006.01) | |
| H04L 27/01 | (2006.01) | |
| H04L 27/34 | (2006.01) | |

(52) U.S. Cl.
CPC ............ *H04L 1/0045* (2013.01); *H04L 27/01* (2013.01); *H04L 27/02* (2013.01); *H04L 27/34* (2013.01); *H04L 1/00* (2013.01)

(58) Field of Classification Search
CPC ....... H04L 27/01; H04L 27/34; H04L 1/0045; H04L 27/02; H04L 1/00
USPC ........................................................ 714/776
See application file for complete search history.

(56) References Cited

U.S. PATENT DOCUMENTS

| | | | |
|---|---|---|---|
| 7,071,679 B1 | 7/2006 | Sabih et al. | |
| 7,301,327 B1 | 11/2007 | Sabih et al. | |
| 7,327,985 B2* | 2/2008 | Morfitt, III | ............. G10L 25/48 |
| | | | 455/67.11 |
| 7,420,384 B1 | 9/2008 | Sabih et al. | |
| 7,505,541 B1 | 3/2009 | Brunn et al. | |
| 7,522,687 B2* | 4/2009 | Cranford, Jr. | ........... H03L 7/091 |
| | | | 375/355 |
| 7,634,032 B2* | 12/2009 | Chu | ...................... H04L 1/0045 |
| | | | 375/346 |
| 7,965,801 B1 | 6/2011 | O'Reilly et al. | |
| 8,593,217 B1 | 11/2013 | Kong | |
| 8,917,803 B1 | 12/2014 | Asuncion et al. | |
| 8,923,380 B1 | 12/2014 | Malhotra | |
| 8,928,334 B1 | 1/2015 | Raj | |
| 8,934,594 B1 | 1/2015 | Malhotra | |
| 8,971,468 B1 | 3/2015 | Novellini | |
| 8,995,514 B1 | 3/2015 | Asuncion et al. | |
| 9,000,812 B1 | 4/2015 | Lowney et al. | |
| 9,118,447 B1 | 8/2015 | Malhotra | |
| 9,178,552 B1 | 11/2015 | Satarzadeh et al. | |
| 9,323,457 B2 | 4/2016 | Blott et al. | |
| 9,397,824 B1* | 7/2016 | Hoshyar | ............... H04L 7/0331 |
| 9,411,701 B2 | 8/2016 | Azad | |

(Continued)

*Primary Examiner* — James C Kerveros

(74) *Attorney, Agent, or Firm* — Patterson + Sheridan, LLP; Robert M. Brush

(57) ABSTRACT

An example method of capturing an error distribution data for a serial channel includes: receiving a signal from the serial channel at a receiver in an integrated circuit (IC), the signal encoding data using pulse amplitude modulation (PAM) scheme having more than two levels; determining a plurality of symbols from the signal, each of the plurality of symbols encoding a plurality of bits; comparing the plurality of symbols with a plurality of expected symbols to detect a plurality of symbol errors; generating the error distribution data by accumulating numbers of the plurality of symbol errors across a plurality of bins based error type; and transmitting the error distribution data from the receiver to a computing system for processing.

14 Claims, 5 Drawing Sheets

(56) References Cited

U.S. PATENT DOCUMENTS

| | | | | |
|---|---|---|---|---|
| 9,699,009 B1* | 7/2017 | Ainspan | ............. | H04L 25/4917 |
| 2004/0120422 A1* | 6/2004 | Lin | ......................... | H04L 27/34 |
| | | | | 375/316 |
| 2005/0207346 A1* | 9/2005 | Chu | ..................... | H04L 1/0045 |
| | | | | 370/241 |
| 2007/0086546 A1* | 4/2007 | Koo | ..................... | H04L 25/069 |
| | | | | 375/340 |
| 2014/0270030 A1* | 9/2014 | Hammad | ............... | H04L 7/0079 |
| | | | | 375/371 |
| 2014/0334579 A1* | 11/2014 | Lincoln | ................. | H04L 25/067 |
| | | | | 375/346 |
| 2015/0341190 A1* | 11/2015 | Cipriano | ........... | H04L 25/03076 |
| | | | | 375/232 |

* cited by examiner

400

| Expected | Received | Lvl-3 Err | Lvl-2 Err | Lvl-1 Err | Lvl-0 Err | 1-lvl Err | 2-lvl Err | 3-lvl Err |
|---|---|---|---|---|---|---|---|---|
| 2'b10 | 2'b11 | +1 | | | | +1 | | |
| 2'b10 | 2'b01 | +1 | | | | | +1 | |
| 2'b10 | 2'b00 | +1 | | | | | | +1 |
| 2'b11 | 2'b01 | | +1 | | | +1 | | |
| 2'b11 | 2'b10 | | +1 | | | +1 | | |
| 2'b11 | 2'b00 | | +1 | | | | +1 | |
| 2'b01 | 2'b11 | | | +1 | | +1 | | |
| 2'b01 | 2'b10 | | | +1 | | | +1 | |
| 2'b01 | 2'b00 | | | +1 | | +1 | | |
| 2'b00 | 2'b10 | | | | +1 | | | +1 |
| 2'b00 | 2'b11 | | | | +1 | | +1 | |
| 2'b00 | 2'b01 | | | | +1 | +1 | | |

FIG. 4

PAM MULTI-LEVEL ERROR DISTRIBUTION SIGNATURE CAPTURE

TECHNICAL FIELD

Examples of the present disclosure generally relate to electronic circuits and, in particular, to capturing multi-level error distribution signatures in pulse amplitude modulation (PAM) receivers.

BACKGROUND

A serializer is configured to generate a serialized signal for transmission across a channel between a transmitter and a receiver. The transmitter employs an encoding scheme to transmit symbols to the receiver across the channel. An example encoding scheme is a 2-level pulse amplitude modulation (PAM) scheme (PAM-2), which is also referred to as a non-return-to-zero (NRZ) scheme. For the NRZ scheme, the transmitted symbols have normalized signal levels of +1 and −1, where each symbol encodes a single bit. As data rates increase to meet demand for higher throughput, transmitters employ more than 2-level PAM schemes, where each symbol encodes more than one bit. For example, a PAM-4 scheme transmits symbols that have normalized signal levels of −3, −1, +1, and +3, where each symbol encodes two bits.

Conventional statistical analysis of the channel for NRZ may include modeling channel errors with a Gaussian probability distribution function. However, a Gaussian probability distribution function may not hold true for PAM-4. For example, in PAM-4, a Gaussian probability distribution function would predict more 1-level errors than 2-level errors. However, a systematic design issue in the system can cause more 2-level errors than 1-level errors. Alternatively, the upper two levels may exhibit more errors than the lower two levels, or the outer levels may exhibit more errors than the inner levels, due to design mismatch. Further, the conventional bit error rate (BER) analysis is insufficient to provide specific information for the distribution of errors in PAM-4 signaling.

SUMMARY

Techniques for capturing multi-level error distribution signatures in pulse amplitude modulation (PAM) receivers are described. In an example, a method of capturing an error distribution data for a serial channel includes: receiving a signal from the serial channel at a receiver in an integrated circuit (IC), the signal encoding data using pulse amplitude modulation (PAM) scheme having more than two levels; determining a plurality of symbols from the signal, each of the plurality of symbols encoding a plurality of bits; comparing the plurality of symbols with a plurality of expected symbols to detect a plurality of symbol errors; generating the error distribution data by accumulating numbers of the plurality of symbol errors across a plurality of bins based error type; and transmitting the error distribution data from the receiver to a computing system for processing.

In another example, a receiver in an integrated circuit (IC) includes a front end configured to: receive a signal from a serial channel, the signal encoding data using pulse amplitude modulation (PAM) scheme having more than two levels; and determine a plurality of symbols from the signal, each of the plurality of symbols encoding a plurality of bits. The receiver further includes an error detection circuit, coupled to the front end, configured to: compare the plurality of symbols with a plurality of expected symbols to detect a plurality of symbol errors; generate the error distribution data by accumulating numbers of the plurality of symbol errors across a plurality of bins based error type; and transmit the error distribution data to a computing system for processing.

In another example, a system for capturing an error distribution data for a serial channel includes an integrated circuit having a receiver configured to: receive a signal from the serial channel at a receiver in an integrated circuit (IC), the signal encoding data using pulse amplitude modulation (PAM) scheme having more than two levels; determine a plurality of symbols from the signal, each of the plurality of symbols encoding a plurality of bits; compare the plurality of symbols with a plurality of expected symbols to detect a plurality of symbol errors; generate the error distribution data by accumulating numbers of the plurality of symbol errors across a plurality of bins based error type; and transmit the error distribution data for processing. The system further includes a computing system configured to receive the error distribution data from the receiver.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 4 depicts a table showing an example error signature computing scheme for PAM-4 signaling.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
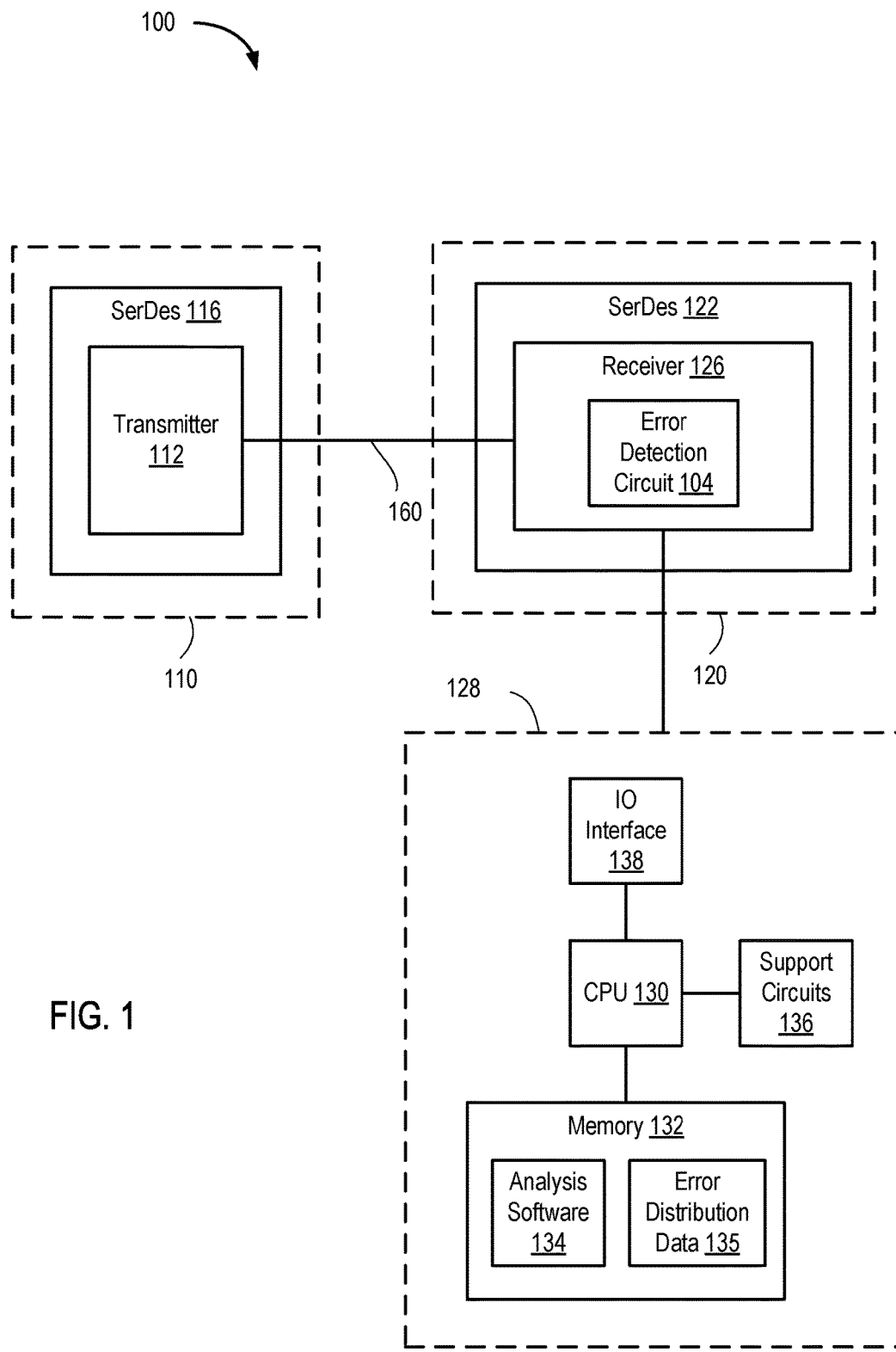
FIG. 1 is a block diagram depicting a system for capturing error distribution data for a serial communication channel according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

FIG. 1 is a block diagram depicting a system 100 for capturing error distribution data for a serial communication channel according to an example. The system 100 comprises a transmitter 112 coupled to a receiver 126 over transmission medium 160 (also referred to as transmission channel 160). The system 100 further includes a computing system 128 coupled to the receiver 126. The transmitter 112 can be part of a serializer-deserializer (SerDes) 116. The receiver 126 can be part of a SerDes 122. The transmission medium 160 comprises an electrical path between the transmitter 112 and the receiver 126 and can include printed circuit board (PCB) traces, vias, cables, connectors, decoupling capacitors, and the like. The receiver of the SerDes 116, and the transmitter of the SerDes 122, are omitted for clarity. In some examples, the SerDes 116 can be disposed in an integrated circuit (IC) 110, and the SerDes 122 can be disposed in an IC 120.

The computing system 128 can include conventional components of a computing device, such as a central processing unit (CPU) 130, system memory 132, various support circuits 136, and an IO interface 138. The CPU 130 can include one or more microprocessors. The CPU 130 is configured to execute instructions that perform one or more operations described herein. The instructions can be stored in system memory 132, or any other memory/storage in the computing system 128 (e.g., local storage devices, such as hard disks, flash memory modules, solid state disks, optical disks, and the like). The system memory 132 includes devices that store information and can include, for example, random access memory (RAM), read-only memory (ROM), or a combination thereof. The support circuits 136 can include conventional cache, power supplies, clock circuits, data registers, IO interfaces, and the like. The IO interface 138 includes conventional interfaces known in the art. The IO interface 138 can be coupled to the receiver 126. The computing system 128 further includes a software platform comprising analysis software 134 and any other software that facilitates execution of the analysis software (e.g., an operating system). The analysis software 134 includes instructions that are executed by the CPU 130. The analysis software 134 processes error distribution data 135 obtained from the receiver 126, as described further herein.

The transmitter 112 drives serial data onto the transmission medium 160 using a digital baseband modulation technique. In general, the serial data is divided into symbols. The transmitter 112 converts each symbol into an analog voltage mapped to the symbol. The transmitter 112 couples the analog voltage generated from each symbol to the transmission medium 160. In examples, the transmitter 112 uses a pulse amplitude modulation (PAM) scheme having more than two levels (e.g., PAM-m, where m is greater than two). For example, the transmitter 112 can use a PAM-4 scheme to transmit the data, where each symbol encodes two bits of serial data and four analog voltages are used to represent the symbols. While specific examples are described herein with respect to PAM-4, those skilled in the art will appreciate that the techniques described herein apply to other PAM schemes.

The receiver 126 includes an error detection circuit 104. The error detection circuit 104 is configured to capture the distribution of errors on the channel 160 across the respective levels of the PAM scheme. In an example, the error detection circuit 104 generates an error signature that includes errors distributed among 1) PAM levels and 2) the possible differences between PAM levels. The error detection circuit 104 can transmit one or more error signatures to the computing system 128, which stores the error signatures as the error distribution data 135. The analysis software 134 is configured to analyze the error distribution data 135 to determine a model for the channel errors. A user can then adjust parameters of the receiver 126 in response to the channel error model determined from the error distribution data 135 in an attempt to minimize errors. The error detection circuit 104 captures level-specific errors to provide specific error information, as opposed to conventional bit error rate (BER) techniques that only provide an aggregated number of errors over a period of time.

Figure 2:
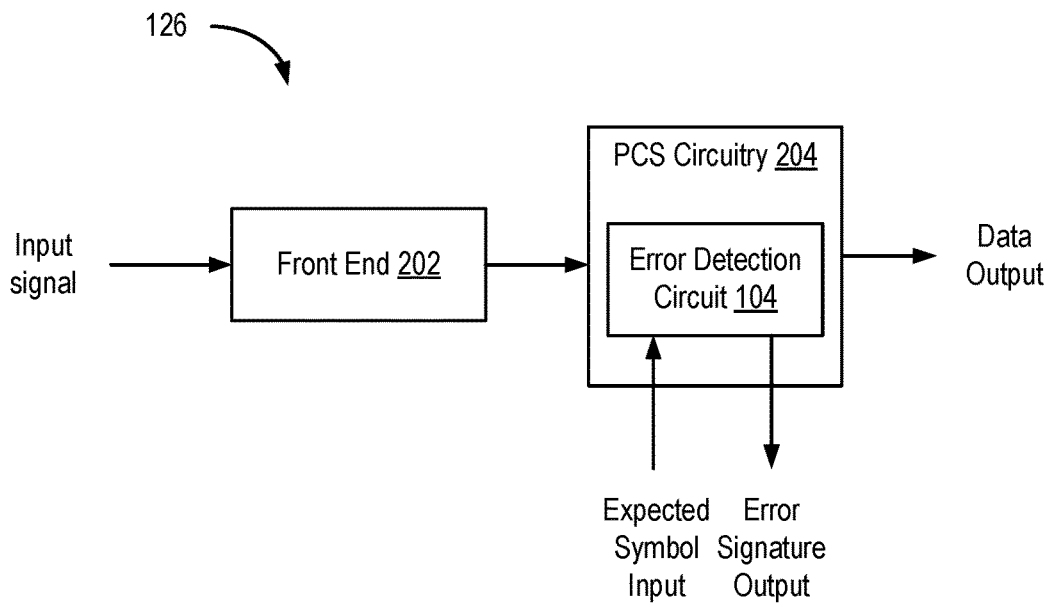
FIG. 2 is a block diagram depicting a receiver according to an example.

FIG. 2 is a block diagram depicting the receiver 126 according to an example. The receiver 126 comprises a front end 202 and physical coding sublayer (PCS) circuitry 204. The front end 202 is configured to receive an input signal from the channel 160. The front end 202 includes various components for receiving an analog signal and generating symbols therefrom, such as automatic gain control (AGC) circuits, continuous time linear equalizer (CTLE) circuits, sampling circuits, decision feedback equalizer (DFE) circuits, clock data recovery (CDR) circuits, equalizer adaptation circuits, and the like. The output of the front end 202 is a digital signal that provides a sequence of received symbols derived from the input signal. The PCS circuitry 204 is configured to decode the received symbols to recover the transmitted data. An output of the PCS circuitry 204 provides the decoded data.

In the example, the PCS circuitry 204 includes the error detection circuit 104. The error detection circuit 104 includes an input configured to receive expected symbols, and an output that provides captured error signatures. The error detection circuit 104 is configured to compare the received symbols with expected symbols to generate an error signature as described further herein.

Figure 3:
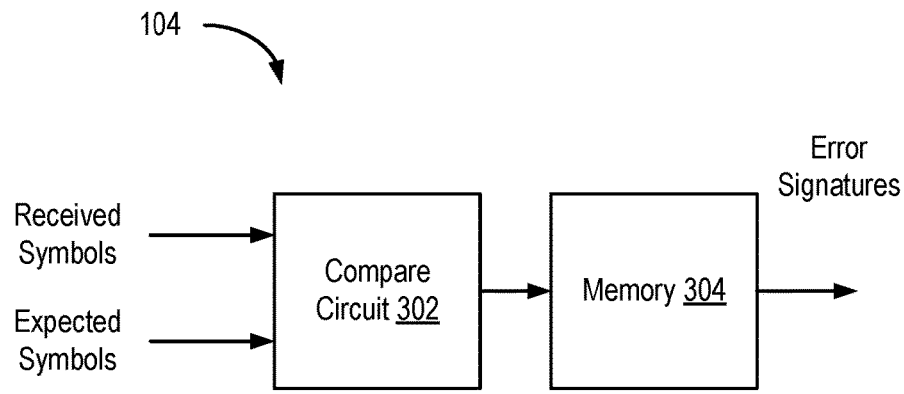
FIG. 3 is a block diagram depicting an error detection circuit according to an example.

FIG. 3 is a block diagram depicting the error detection circuit 104 according to an example. The error detection circuit 104 includes a compare circuit 302 and a memory 304. Inputs to the compare circuit 302 include the received symbols and the expected symbols. An output of the compare circuit 302 is coupled to an input of the memory 304. The compare circuit 302 is configured to error signatures based on comparing the received symbols and the expected symbols. The compare circuit 302 can store the error signature data in the memory 304. The computing system 128 can access the memory 304 to obtain the error signature data. In another example, the compare circuit 302 can directly output the error signature data to the computing system 128.

Figure 5:
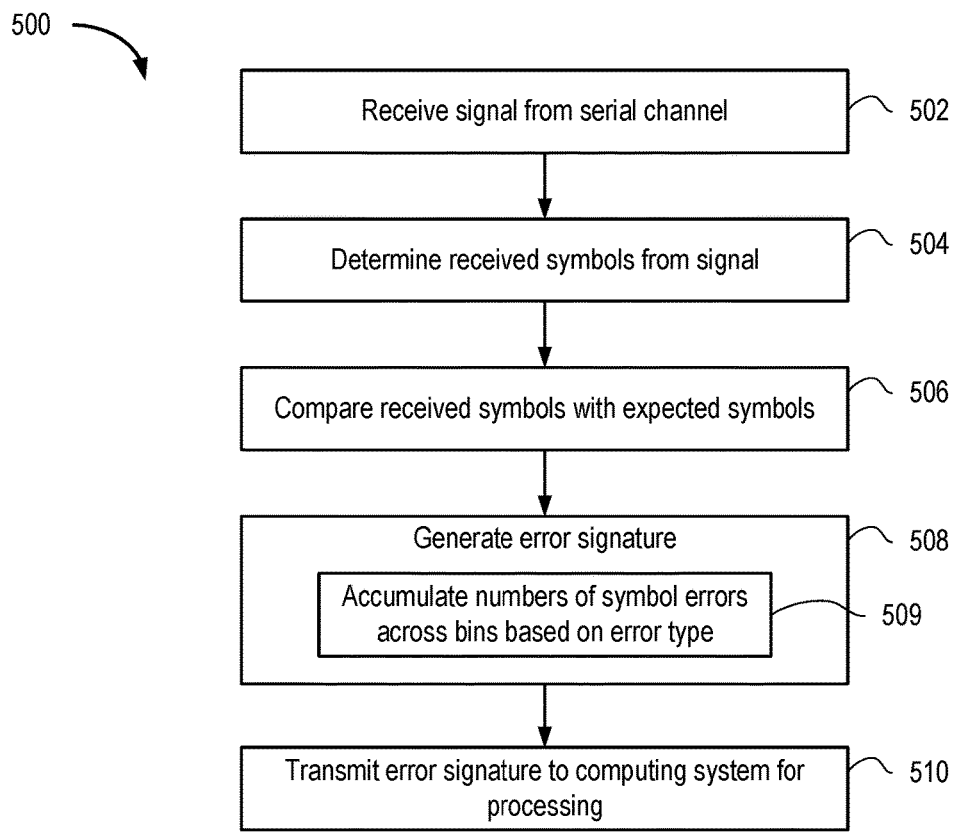
FIG. 5 is a flow diagram depicting a method of capturing an error distribution data for a serial channel according to an example.

FIG. 5 is a flow diagram depicting a method 500 of capturing an error distribution data for a serial channel according to an example. The method 500 begins at step 502, where the front end 202 receives the signal from the channel 160. At step 504, the front end 202 determines the received symbols from the signal. The front end 202 can use conventional gain control, sampling, clock recovery, and equalization techniques to recover the received symbols from the input signal. At step 506, the error detection circuit 104 compares the received symbols with expected symbols. In an example, the input signal conveys data that includes a pseudorandom binary sequence (PRBS) and the expected symbols are the values of the PRBS sequence. At step 508, the error detection circuit 104 generates an error signature from the comparison of the received symbols and the expected symbols. For example, at step 509, the error detection circuit 104 accumulates numbers of symbol errors across bins based on error type. At step 510, the error detection circuit 108 transmits the error signature to the computing system 128 for processing and analysis.

In an example, the bins include a bin for each level of the PAM scheme on the channel 160. For example, PAM-4 includes four levels and the error detection circuit 104 can implement four bins, one for each of the four levels. Each time an expected symbol differs from a received signal, the error detection circuit 104 increments the count in the bin corresponding to the level of the expected symbol. The bins can also include a bin for each possible level difference among the levels of the PAM scheme on the channel 160. For example, PAM-4 includes four levels and three possible differences between the four levels. The error detection circuit 104 can implement three bins, one for each of the three level differences. Each time an expected symbol differs from a received signal, the error detection circuit 104 increments the count in the bin corresponding to the level difference between the expected symbol and the received symbol. Thus, in an example of PAM-4 signaling, the error detection circuit 104 can implement seven different bins and can accumulate errors across the seven bins based on the particular error between received symbol and expected symbol.

FIG. 4 depicts a table 400 showing an example error signature computing scheme for PAM-4 signaling. The table 400 includes a column of expected symbols ("expected") and a column of received symbols ("received"). In the example, the PAM-4 signaling scheme includes the following gray-coded symbols corresponding to the voltage levels 0 through 3: level 0=2'b00; level 1=2'b01; level 2=2'b11; and level 3=2'b10, where the notation "2'b" denotes a binary number (e.g., a base 2 number). The table 400 includes columns for seven bins: 1) four columns for errors associated with each of the four levels of the PAM-4 scheme, i.e., Lvl-3 Err, Lvl-2 Err, Lvl-1 Err, and Lvl-0 Err; and 2) three columns for errors associated with each of the three level differences of the PAM-4 scheme, i.e., 1-lvl Err, 2-lvl Err, and 3-lvl Err.

Consider an expected symbol 2'b10, which corresponds to level 3 in the example. The error detection circuit 104 increments the value in the Lvl-3 Err bin if the symbol 2'b10 is not received. If the received symbol is 2'b11 (level 2), the error detection circuit 104 increments the value in the 1-lvl Err bin (i.e., there is a one-level difference between the received symbol and the expected symbol). If the received symbol is 2'b01 (level 1), the error detection circuit 104 increments the value in the 2-lvl Err bin (i.e., there is a two-level difference between the received and expected symbols). If the received symbol is 2'b00 (level 0), the error detection circuit 104 increments the value in the 3-lvl Err bin (i.e., there is a three-level difference between the received and expected symbols).

Consider an expected symbol 2'b11, which corresponds to level 2 in the example. The error detection circuit 104 increments the value in the Lvl-2 Err bin if the symbol 2'b11 is not received. If the received symbol is 2'b01 (level 1) or 2'b10 (level 3), the error detection circuit 104 increments the value in the 1-lvl Err bin. If the received symbol is 2'b00 (level 0), the error detection circuit 104 increments the value in the 2-lvl Err bin.

Consider an expected symbol 2'b01, which corresponds to level 1 in the example. The error detection circuit 104 increments the value in the Lvl-1 Err bin if the symbol 2'b01 is not received. If the received symbol is 2'b00 (level 0) or 2'b11 (level 2), the error detection circuit 104 increments the value in the 1-lvl Err bin. If the received symbol is 2'b10 (level 3), the error detection circuit 104 increments the value in the 2-lvl Err bin.

Consider the expected symbol 2'b00, which corresponds to level 0 in the example. The error detection circuit 104 increments the value in the Lvl-0 Err bin if the symbol 2'b00 is not received. If the received symbol is 2'b01 (level 1), the error detection circuit 104 increments the value in the 1-lvl Err bin. If the received symbol is 2'b11 (level 2), the error detection circuit 104 increments the value in the 2-lvl Err bin. If the received symbol is 2'b10 (level 3), the error detection circuit 104 increments the value in the 3-lvl Err bin.

The error detection circuit 104 can use the table 400 to determine error signatures for PAM-4 signaling. The error detection circuit 104 can use similar tables to determine error signatures for PAM-M signaling, where M is greater than four. The only difference is that the tables would include more bins for the increased number of levels.

Figure 6:
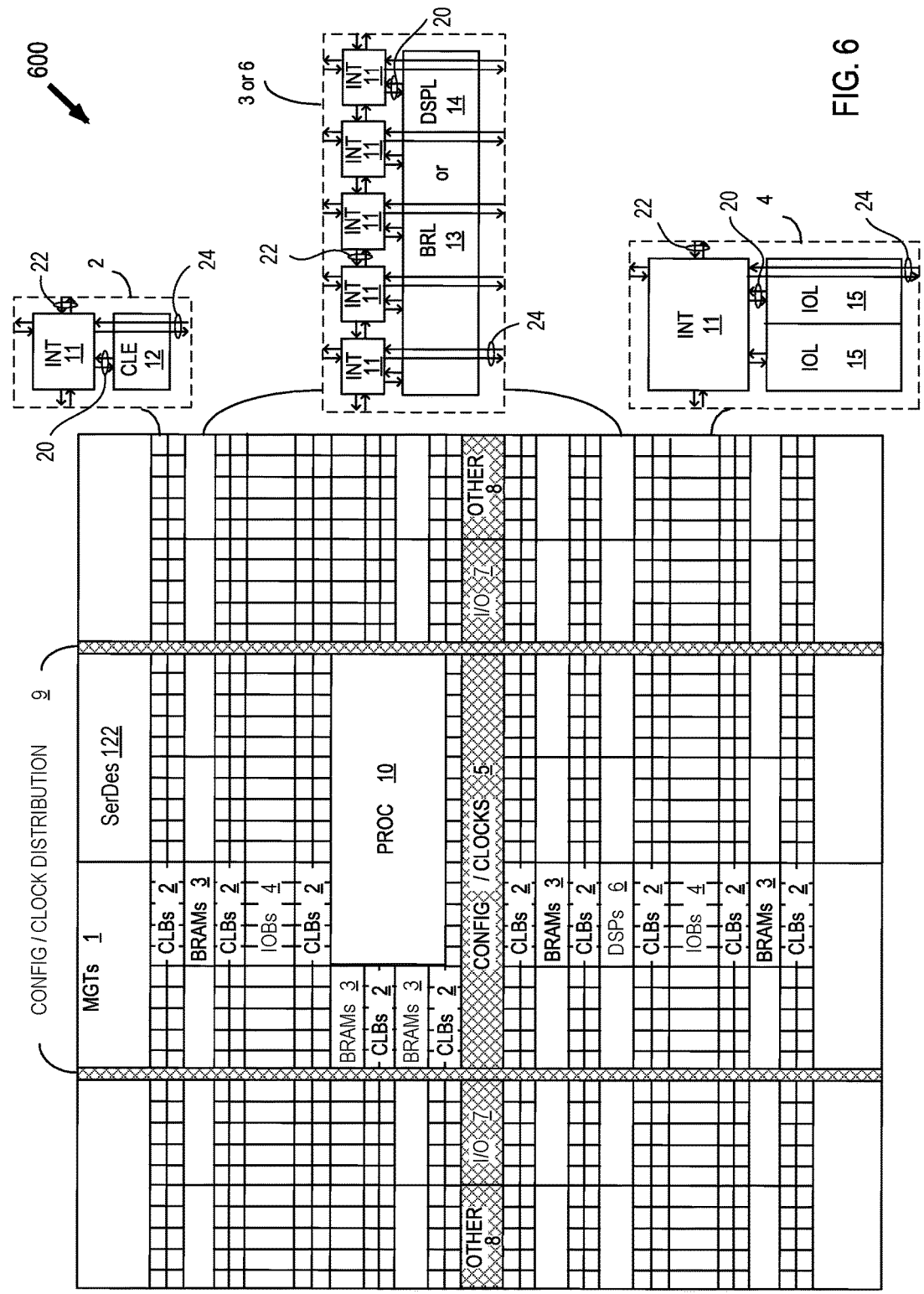
FIG. 6 illustrates an architecture of a field programmable gate array (FPGA) according to an example.

The SerDes 122 described above can be implemented within an integrated circuit, such as a field programmable gate array (FPGA) or like type programmable circuit. FIG. 6 illustrates an architecture of FPGA 600 that includes a large number of different programmable tiles including multi-gigabit transceivers ("MGTs") 1, configurable logic blocks ("CLBs") 2, random access memory blocks ("BRAMs") 3, input/output blocks ("IOBs") 4, configuration and clocking logic ("CONFIG/CLOCKS") 5, digital signal processing blocks ("DSPs") 6, specialized input/output blocks ("I/O") 7 (e.g., configuration ports and clock ports), and other programmable logic 8 such as digital clock managers, analog-to-digital converters, system monitoring logic, and so forth. Some FPGAs also include dedicated processor blocks ("PROC") 10. FPGA 600 can include one or more instances of SerDes 122 described above.

In some FPGAs, each programmable tile can include at least one programmable interconnect element ("INT") 11 having connections to input and output terminals 20 of a programmable logic element within the same tile, as shown by examples included at the top of FIG. 6. Each programmable interconnect element 11 can also include connections to interconnect segments 22 of adjacent programmable interconnect element(s) in the same tile or other tile(s). Each programmable interconnect element 11 can also include connections to interconnect segments 24 of general routing resources between logic blocks (not shown). The general routing resources can include routing channels between logic blocks (not shown) comprising tracks of interconnect segments (e.g., interconnect segments 24) and switch blocks (not shown) for connecting interconnect segments. The interconnect segments of the general routing resources (e.g., interconnect segments 24) can span one or more logic blocks. The programmable interconnect elements 11 taken together with the general routing resources implement a programmable interconnect structure ("programmable interconnect") for the illustrated FPGA.

In an example implementation, a CLB 2 can include a configurable logic element ("CLE") 12 that can be programmed to implement user logic plus a single programmable interconnect element ("INT") 11. A BRAM 3 can include a BRAM logic element ("BRL") 13 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 6 can include a DSP logic element ("DSPL") 14 in addition to an appropriate number of programmable interconnect elements. An IOB 4 can include, for example, two instances of an input/output logic element ("IOL") 15 in addition to one instance of the programmable interconnect element 11. As will be clear to those of skill in the art, the actual I/O pads connected, for example, to the I/O logic element 15 typically are not confined to the area of the input/output logic element 15.

In the pictured example, a horizontal area near the center of the die (shown in FIG. 6) is used for configuration, clock, and other control logic. Vertical columns 9 extending from this horizontal area or column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, processor block 10 spans several columns of CLBs and BRAMs. The processor block 10 can various components ranging from a single microprocessor to a complete programmable processing system of microprocessor(s), memory controllers, peripherals, and the like.

Note that FIG. 6 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 6 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

As shown in FIG. 1, the receiver 126 is coupled to the computing system 128 for providing the error distribution data 135. In an example, the computing system 128 is external to the IC 120 having the receiver 126 (e.g., external to the FPGA 600). In other example, the computing system 128 is implemented within the IC 120 (e.g., using the processor block 110).

While the foregoing is directed to specific examples, other and further examples may be devised without departing from the basic scope thereof, and the scope thereof is determined by the claims that follow.

What is claimed is:

1. A method of capturing an error distribution data for a serial channel, comprising:
   receiving a signal from the serial channel at a receiver in an integrated circuit (IC), the signal being transmitted on a transmission medium using a digital baseband modulation technique, the signal having encoded data that uses a pulse amplitude modulation (PAM) scheme having more than two levels;
   determining a plurality of symbols from the signal, each of the plurality of symbols encoding a plurality of bits;
   comparing the plurality of symbols with a plurality of expected symbols to detect a plurality of symbol errors;
   generating the error distribution data by accumulating numbers of the plurality of symbol errors across a plurality of bins based error type, the plurality of bins including a bin for each level of the PAM scheme and a bin for each level difference among levels in the PAM scheme; and
   transmitting the error distribution data from the receiver to a computing system for processing.

2. The method of claim 1, wherein the PAM scheme includes four levels, and wherein the plurality of bins include first bins for levels zero through four of the PAM scheme and second bins for one-level, two-level, and three-level differences.

3. The method of claim 1, wherein the data includes a pseudorandom binary sequence (PRBS), and wherein the expected symbols are expected values for the PRBS sequence.

4. The method of claim 1, wherein the computing system is disposed in the IC.

5. The method of claim 1, wherein the computing system is disposed external to the IC.

6. A receiver in an integrated circuit (IC), the receiver comprising:
   a front end configured to:
      receive a signal from a serial channel, the signal being transmitted on a transmission medium using a digital baseband modulation technique, the signal having encoded data that uses a pulse amplitude modulation (PAM) scheme having more than two levels; and
      determine a plurality of symbols from the signal, each of the plurality of symbols encoding a plurality of bits; and
   an error detection circuit, coupled to the front end, configured to:
      compare the plurality of symbols with a plurality of expected symbols to detect a plurality of symbol errors;
      generate the error distribution data by accumulating numbers of the plurality of symbol errors across a plurality of bins based error type, the plurality of bins including a bin for each level of the PAM scheme and a bin for each level difference among levels in the PAM scheme; and
      transmit the error distribution data to a computing system for processing.

7. The receiver of claim 6, wherein the PAM scheme includes four levels, and wherein the plurality of bins include first bins for levels zero through four of the PAM scheme and second bins for one-level, two-level, and three-level differences.

8. The receiver of claim 6, wherein the data includes a pseudorandom binary sequence (PRBS), and wherein the expected symbols are expected values for the PRBS sequence.

9. The receiver of claim 6, wherein the computing system is disposed in the IC.

10. The receiver of claim 6, wherein the computing system is disposed external to the IC.

11. A system for capturing an error distribution data for a serial channel, comprising:
    an integrated circuit having a receiver configured to:
       receive a signal from the serial channel, the signal being transmitted on a transmission medium using a digital baseband modulation technique, the signal having encoded data that uses a pulse amplitude modulation (PAM) scheme having more than two levels;
       determine a plurality of symbols from the signal, each of the plurality of symbols encoding a plurality of bits;
       compare the plurality of symbols with a plurality of expected symbols to detect a plurality of symbol errors;
       generate the error distribution data by accumulating numbers of the plurality of symbol errors across a plurality of bins based error type, the plurality of bins including a bin for each level of the PAM scheme and a bin for each level difference among levels in the PAM scheme; and transmit the error distribution data for processing; and a computing system configured to receive the error distribution data from the receiver.

12. The system of claim 11, wherein the PAM scheme includes four levels, and wherein the plurality of bins include first bins for levels zero through four of the PAM scheme and second bins for one-level, two-level, and three-level differences.

13. The system of claim 11, wherein the computing system is disposed in the IC.

14. The system of claim 11, wherein the computing system is disposed external to the IC.

* * * * *